United States Patent
Brekelbaum et al.

(10) Patent No.: US 10,540,287 B2
(45) Date of Patent: Jan. 21, 2020

(54) SPATIAL MEMORY STREAMING CONFIDENCE MECHANISM

(71) Applicant: Samsung Electronics Co., Ltd., Gyeonggi-do (KR)

(72) Inventors: Edward A Brekelbaum, Austin, TX (US); Arun Radhakrishnan, Austin, TX (US)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 15/690,931

(22) Filed: Aug. 30, 2017

(65) Prior Publication Data

US 2018/0329822 A1 Nov. 15, 2018

Related U.S. Application Data

(60) Provisional application No. 62/505,318, filed on May 12, 2017, provisional application No. 62/535,460, filed on Jul. 21, 2017.

(51) Int. Cl.
*G06F 12/00* (2006.01)
*G06F 12/0862* (2016.01)
(Continued)

(52) U.S. Cl.
CPC .......... *G06F 12/0862* (2013.01); *G06F 3/06* (2013.01); *G06F 9/30043* (2013.01);
(Continued)

(58) Field of Classification Search
CPC .......... G06F 12/0862; G06F 9/30043; G06F 9/3802; G06F 12/0811; G06F 12/0875; G06N 20/00

See application file for complete search history.

(56) References Cited

U.S. PATENT DOCUMENTS 6,910,106 B2 6/2005 Sechrest et al.
6,934,809 B2 8/2005 Tremblay et al.
(Continued)

FOREIGN PATENT DOCUMENTS

| JP | 2000-250808 A | 9/2000 |
|---|---|---|
| KR | 10-2004-0031645 | 4/2004 |
| KR | 10-1681423 B1 | 11/2016 |

OTHER PUBLICATIONS

Ferdman, Michael et al., Spatial Memory Streaming with Rotated Patterns, Journal of Instruction Level Parallelism, Data Prefetching Championship, Feb. 4, 2009, 5 pages.
(Continued)

*Primary Examiner* — Gurtej Bansal
(74) *Attorney, Agent, or Firm* — The Farrell Law Firm, P.C.

(57) ABSTRACT

Apparatuses and methods of manufacturing same, systems, and methods for a spatial memory streaming (SMS) prefetch engine are described. In one aspect, the SMS prefetch engine includes a pattern history table (PHT), which has a table in which each entry has an offset list field comprising sub-fields for offset values from a base offset value within a region and a per-offset confidence field comprising sub-fields for per-offset confidence levels corresponding to each offset value. When a PHT entry is activated, the per-offset confidence values corresponding to each offset value in the offset list field of the PHT entry are updated by matching current accesses to the stored offset values in the offset list field of the activated PHT entry. Continuous learning may be provided to the SMS engine at least by the per-offset confidence levels.

17 Claims, 8 Drawing Sheets

(51) Int. Cl.
  *G06F 9/30*     (2018.01)
  *G06F 9/38*     (2018.01)
  *G06F 12/0811*   (2016.01)
  *G06F 12/0875*   (2016.01)
  *G06N 20/00*    (2019.01)
  *G06F 3/06*     (2006.01)

(52) U.S. Cl.
  CPC ........ *G06F 9/3802* (2013.01); *G06F 12/0811* (2013.01); *G06F 12/0875* (2013.01); *G06N 20/00* (2019.01); *G06F 2212/452* (2013.01); *G06F 2212/6024* (2013.01); *G06F 2212/62* (2013.01)

(56) References Cited

U.S. PATENT DOCUMENTS

| | | |
|---|---|---|
| 7,185,155 B2 | 2/2007 | Sechrest et al. |
| 7,698,513 B2 | 4/2010 | Sechrest et al. |
| 7,808,503 B2 | 10/2010 | Duluk, Jr. et al. |
| 8,032,723 B2 | 10/2011 | Sechrest et al. |
| 8,539,186 B2 | 9/2013 | Sechrest et al. |
| 8,812,790 B2 | 8/2014 | Pruthi |
| 8,856,452 B2 | 10/2014 | Sun et al. |
| 9,529,723 B2 | 12/2016 | Cain, III et al. |
| 9,542,323 B2 | 1/2017 | Sundaram et al. |
| 9,665,491 B2 | 5/2017 | Radhakrishnan et al. |
| 2006/0190552 A1* | 8/2006 | Henze ............. H04L 29/12009 709/216 |
| 2013/0019047 A1 | 1/2013 | Podvalny et al. |
| 2013/0346703 A1 | 12/2013 | McCauley et al. |
| 2015/0026414 A1* | 1/2015 | Kalamatianos ..... G06F 12/0862 711/137 |
| 2015/0067264 A1 | 3/2015 | Eckert et al. |
| 2015/0199276 A1 | 7/2015 | Radhakrishnan et al. |
| 2016/0019065 A1 | 1/2016 | Hayenga et al. |
| 2016/0019155 A1 | 1/2016 | Radhakrishnan et al. |
| 2017/0083443 A1 | 3/2017 | Wang et al. |
| 2017/0116128 A1 | 4/2017 | Sundaram et al. |

OTHER PUBLICATIONS

Ferdman, Michael et al., Spatial Memory Streaming with Rotated Patterns, (slides) Journal of Instruction Level Parallelism, Data Prefetching Championship, Feb. 4, 2009, 35 pgs.

Grannaes, Marius et al., Storage Efficient Hardware Prefetching using Delta Correlating Prediction Tables, Journal of Instruction Level Parallelism, Data Prefetching Championship, Feb. 4, 2009, 5 pages.

Grannaes, Marius et al., Storage Efficient Hardware Prefetching using Delta Correlating Prediction Tables, (slides) Journal of Instruction Level Parallelism, Data Prefetching Championship, Feb. 14, 2008, 52 pages.

Hamacher et al., Computer Organization, Chapter 8—Pipelining, Jun. 28, 2001, pp. 453-510.

Liu, Gang et al., Enhancement for Accurate Stream Prefetching, Journal of Instruction Level Parallelism, Data Prefetching Championship, Feb. 4, 2009, 6 pages.

Liu, Gang et al., Enhancement for Accurate Stream Prefetching, (slides) Journal of Instruction Level Parallelism, Data Prefetching Championship, Feb. 4, 2009, 15 pages.

Mittal, Sparsh, A Survey of Recent Prefetching Techniques for Processor Caches, ACM Computing Surveys, vol. 0, No. 0, Article 0, 2016, 36 pages.

Oren, Nir, A Survey of prefetching techniques, Jul. 18, 2000, 12 pages.

Stony Brook University, Prefetching, (slides) CSE 502: Computer Architecture, Spring 2016, 32 pages.

Honarmand, Nima, Stony Brook University, Memory Prefetching, (slides) CSE 502: Computer Architecture, Spring 2015, 30 pages.

Ramos, Luis M. et al., Multi-level Adaptive Prefetching based on Performance Gradient Tracking, Journal of Instruction Level Parallelism, Data Prefetching Championship, Feb. 4, 2009, 6 pages.

Ramos, Luis M. et al., Multi-level Adaptive Prefetching based on Performance Gradient Tracking, (slides) Journal of Instruction Level Parallelism, Data Prefetching Championship, Raleigh, NC, Feb. 15, 2009, 18 pages.

Sharif, Ahmad et al., Data Prefetching Mechanism by Exploiting Global and Local Access Patterns, Journal of Instruction Level Parallelism, Data Prefetching Championship, Feb. 4, 2009, 6 pages.

Sharif, Ahmad et al., Data Prefetching Mechanism by Exploiting Global and Local Access Patterns, (slides) Journal of Instruction Level Parallelism, Data Prefetching Championship, Feb. 4, 2009, 17 pages.

Somogyi, Stephen et al., Spatial Memory Streaming, Journal of Instruction-Level Parallelism 13 (2011), 26 pages.

Somogyi, Stephen et al., Spatial Memory Streaming, Proceedings of the 33rd International Symposium on Computer Architecture (ISCA'06), 12 pages.

Verma, Santhosh et al., A Hybrid Adaptive Feedback Based Prefetcher, Journal of Instruction Level Parallelism, Data Prefetching Championship, Feb. 4, 2009, 5 pages.

Verma, Santhosh et al., A Hybrid Adaptive Feedback Based Prefetcher, (slides), Journal of Instruction Level Parallelism, Data Prefetching Championship, Feb. 4, 2009, 23 pgs.

\* cited by examiner

SPATIAL MEMORY STREAMING CONFIDENCE MECHANISM

PRIORITY

This application claims priority under 35 U.S.C. § 119(e) to U.S. Provisional Patent Application Ser. No. 62/505,318 filed on May 12, 2017, and to U.S. Provisional Patent Application Ser. No. 62/535,460 filed on Jul. 21, 2017, the entire contents of both of which are incorporated herein by reference.

FIELD

The present disclosure relates generally to processor memory management, and more particularly, to spatial memory streaming confidence mechanisms.

BACKGROUND

Computer processors perform cache prefetching to boost execution performance by fetching instructions or data from their original storage in slower memory (i.e., having slower read/write times) to a faster local memory (i.e., having faster read/write times and often located nearer to the instruction/data pipelines) before it is actually needed. Most modern computer processors have one or more fast and local cache memories in which prefetched data and/or instructions are held until required.

However, prefetching works by guessing. To put it more technically, prefetching uses the current series of memory demands for data/instructions by the processing engine to predict, based on, e.g., past performance, probability models, algorithms, and/or what data/instructions the processing engine will demand next. Accordingly, inaccurate prefetches are problematic, as the wrong data has to be removed from the local faster memory, and the correct data must be accessed and moved into the local faster memory. Inaccurate prefetches unnecessarily increase power consumption, produce system congestion (caused at least by the added movement/exchange of the wrong data with the correct data), and obviously pollute and destabilize the normal functioning of the caches.

There are different methods of prefetching, often distinguished by their patterns for prefetching data/instructions, such as sequential prefetching and stride prefetching. Although somewhat oversimplified, sequential prefetching can be thought of as prefetching successive contiguous memory blocks, while stride prefetching can be thought of as jumping ahead (or "striding" an s number of blocks) in order to prefetch the memory blocks.

There is also a more specialized scheme related to striding known as spatial memory streaming. See, e.g., Somogyi et al., *Spatial Memory Streaming*, $33^{rd}$ Int'l Symposium on Computer Architecture (TSCA 2006), pp. 252-263 (hereinafter, "Somogyi 2006"); and Somogyi et al., *Spatial Memory Streaming*, Journal of Instruction-Level Parallelism 13 (2011), pp. 1-26 (hereinafter, "Somogyi 2011"), both of which are incorporated herein by reference in their entireties. In spatial memory streaming (SMS), strong correlations between code and access patterns are detected and exploited to predict memory access patterns in groups with similar relative spacing ("spatial correlation").

However, SMS schemes suffer a variety of weaknesses. SMS cannot handle the shifting alignment of patterns with respect to the line boundaries between caches. Furthermore, the spatial bit vectors typically used for spatial patterns force larger granularity per access, and cannot track temporal order. SMS also lacks robust confidence mechanisms, and is not dynamically adaptive, i.e., SMS is unable to adapt to program phase changes, such as when dynamic branch behavior changes offset patterns. These weaknesses result in reduced coverage and accuracy, and loss of timeliness, thus reducing performance and increasing power consumption.

SUMMARY

Accordingly, the present disclosure has been made to address at least the problems and/or disadvantages described herein and to provide at least the advantages described below.

According to an aspect of the present disclosure, a spatial memory streaming (SMS) prefetch engine is provided, including a pattern history table (PHT), which includes at least one table in which each entry has an offset list field including sub-fields for offset values from a base offset value within a region and a per-offset confidence field including sub-fields for per-offset confidence levels corresponding to each offset value, wherein, when a PHT entry is activated, the per-offset confidence values corresponding to each offset value therein are updated by matching current accesses to the stored offset values in the activated PHT entry, and wherein continuous learning is provided to the SMS engine at least by the per-offset confidence levels.

According to an aspect of the present disclosure, a method for a spatial memory streaming (SMS) prefetch engine is provided, including maintaining a pattern history table (PHT), which includes at least one table in which each entry has an offset list field including sub-fields for offset values from a base offset value within a region and a per-offset confidence field including sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry, wherein continuous learning is provided to the SMS engine at least by the per-offset confidence levels.

According to an aspect of the present disclosure, an apparatus is provided, including one or more non-transitory computer-readable media; and at least one processor which, when executing instructions stored on one or more non-transitory computer readable media, performs as at least a part of a spatial memory streaming (SMS) prefetch engine which performs the steps of maintaining a pattern history table (PHT), which includes at least one table in which each entry has an offset list field including sub-fields for offset values from a base offset value within a region and a per-offset confidence field including sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry. Continuous learning may be provided to the SMS engine at least by the per-offset confidence levels.

According to an aspect of the present disclosure, a method of manufacturing a chipset is provided, which includes at least one processor which, when executing instructions stored on one or more non-transitory computer readable media, performs the steps of maintaining a pattern history table (PHT) for a spatial memory streaming (SMS) prefetch engine, the PHT table including at least one table in which each entry has an offset list field including sub-fields for offset values from a base offset value within a region and a per-offset confidence field including sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry. Continuous learning may be provided to the SMS engine at least by the per-offset confidence levels.

According to an aspect of the present disclosure, a method of testing an apparatus is provided, including testing whether the apparatus has at least one processor which, when executing instructions stored on one or more non-transitory computer readable media, performs the steps of maintaining a pattern history table (PHT) for a spatial memory streaming (SMS) prefetch engine, the PHT table including at least one table in which each entry has an offset list field including sub-fields for offset values from a base offset value within a region and a per-offset confidence field including sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry; and testing whether the apparatus has the one or more non-transitory computer-readable media which store the instructions. Continuous learning may be provided to the SMS engine at least by the per-offset confidence levels.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
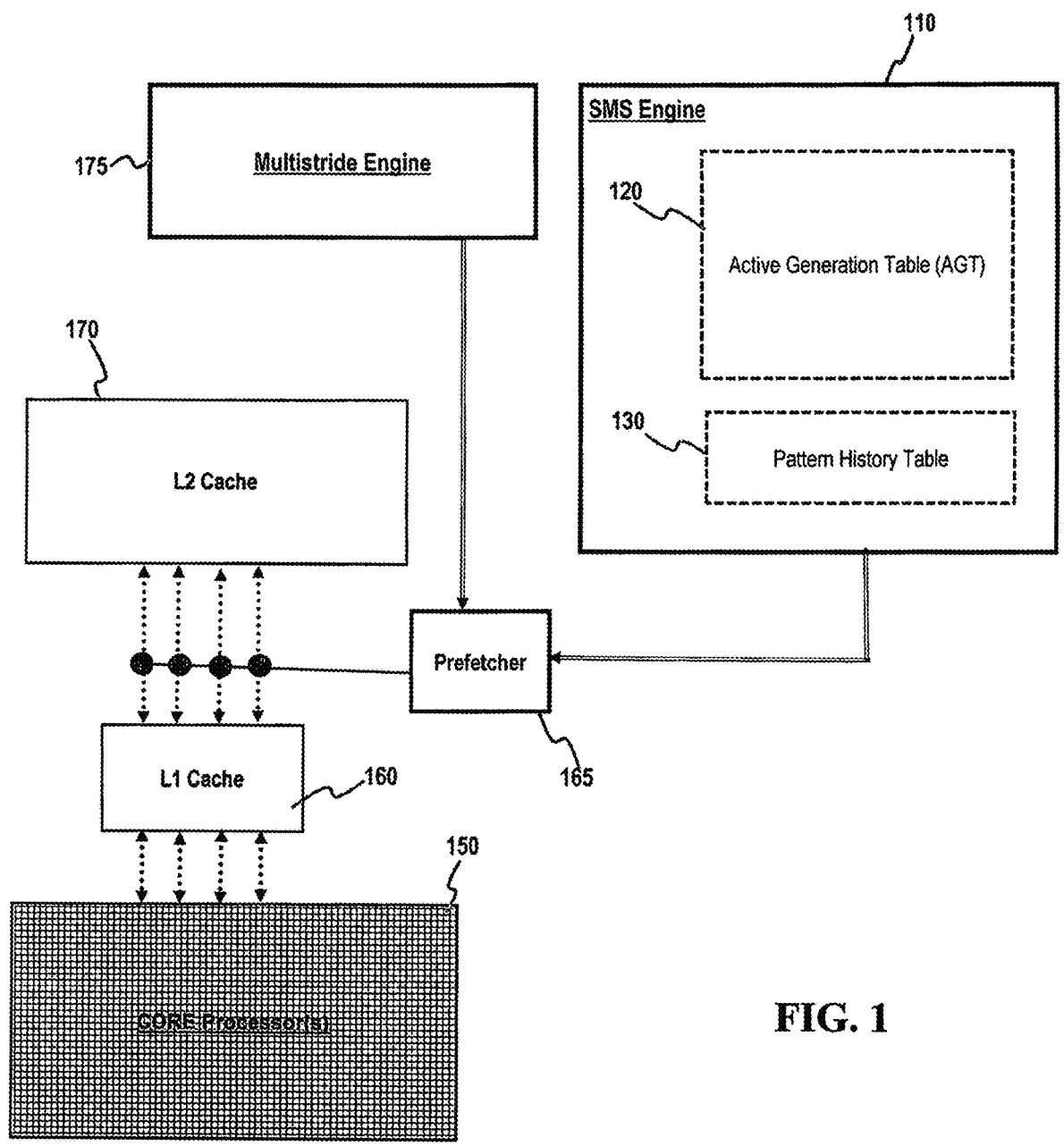
FIG. 1 illustrates an exemplary block diagram of pertinent components of the present system, according to one embodiment.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

Embodiments of the present disclosure provide systems, methods, and apparatuses for updating and controlling a prefetch engine. According to one embodiment, the present disclosure provides continuous learning that adapts to changing program behavior.

According to one embodiment, the present disclosure provides an offset list that captures temporal as well as spatial order, thus resulting in improved timeliness. Instead of storing one bit per cache line in the region, the present disclosure uses a list of offsets, according to one embodiment. In another embodiment, the offsets are stored as a spatial bit vector.

According to one embodiment, the present disclosure provides byte granularity that enables differentiation of accesses (cache load instructions) to a previous line or a subsequent cache line. Embodiments according to the present disclosure may store the starting offset memory location down to the byte. In one embodiment, the size required by the access is also stored in an additional field.

According to various embodiments, the present disclosure provides per offset confidence that allows individual offsets to be rated for accuracy. Accordingly, systems according to the present disclosure adapt to, e.g., changing program phase behavior due to branches. The present system according to one embodiment of the present disclosure may use the access queue to confirm training. The present system according to one embodiment of the present disclosure may use confidence levels to, e.g., scale the number of outstanding prefetches. According to one embodiment, the present system provides a confirmation scheme that allows the most prefetches to be issued from the best trained entries.

According to various embodiments, the present disclosure also provides smarter training by having promotion on the second occurrence of a trigger and using a trigger-to-trigger stamp; blacklisting of triggers (which can be inline or out of line); trigger-to-trigger stride detection; and the use of a hash of the trigger to index table entries.

FIG. 1 illustrates an exemplary block diagram of pertinent components of the present system, according to one embodiment. One or more core processors 150 execute instructions involving data, both of which are stored in memory. To do so, the core processor(s) 150 access an L1 cache 160 for data and instructions while processing. The L1 cache 160, in turn, accesses L2 cache 170.

In terms of accessing data/instructions stored within the L2 cache 170, the L2 cache 170 is broken down into spatial regions, which are described in more detail below. A prefetcher 165 performs fetching of regions from the L2 cache 170 under the control of a multistride engine 175 and a SMS Engine 110. As discussed above, the prefetcher 165 accesses memory addresses in the L2 cache 170 and loads the data into the L1 cache 160, based on a prediction that the core processor 150 will need that data fairly soon. For more details concerning the operations and interactions of such components, see U.S. Pat. No. 9,665,491 to Radhakrishan et al., entitled Adaptive Mechanism to Tune the Degree of Pre-Fetches [sic] Streams, and pending U.S. Patent Pub. No. 2017/0116128 by Sundaram et al., entitled Address Re-Ordering Mechanism for Efficient Pre-Fetch Training in an Out-Of-Order Processor, both of which are commonly owned by the same assignee as the present application and are hereby incorporated by reference.

The multistride engine 175 uses multiple strides in its predicted patterns, and is beyond the scope of the present disclosure. For more details concerning the operation of the multistride engine 175, see U.S. Pat. No. 9,569,361 to Radhakrishan et al., entitled Prefetch Chaining, and pending U.S. Patent Publication No. 2016/0054997 by Radhakrishan et al., entitled Computing System with Stride Prefetch Mechanism and Method of Operation Thereof; both of which are commonly owned by the same assignee as the present application and are hereby incorporated by reference.

The SMS 110 includes an active generation table (AGT) 120 and a pattern history table (PHT) 130. In essence, the AGT 120 records and finds spatial patterns, while the PHT 130 stores spatial patterns including their triggers (i.e., the starting program counter (PC) value which begins the spatial pattern) from the AGT 120, as discussed further below. When a trigger is recognized, the PHT 130, accesses and loads the data from memory addresses in the L2 cache 170, as indicated by the stored spatial pattern indicated by the trigger, into the L1 cache 160, based on the likelihood that such data will be required by the core processor 150.

Depending on the embodiment, the AGT 120 itself may be a single table or many tables. A common structure contains at least two tables, a filter table and a training table, which are used as part of the process of learning/finding spatial patterns in series of instruction loads, as discussed in detail below with reference to FIG. 4.

Accordingly, the present disclosure may be thought of as being directed to two different processes: training/learning, performed by the AGT 120, and actual operation, performed by the PHT 130. Before explaining the training/learning process, a brief summary of the storage of a spatial pattern in the SMS 110 is provided below.

Figure 2:
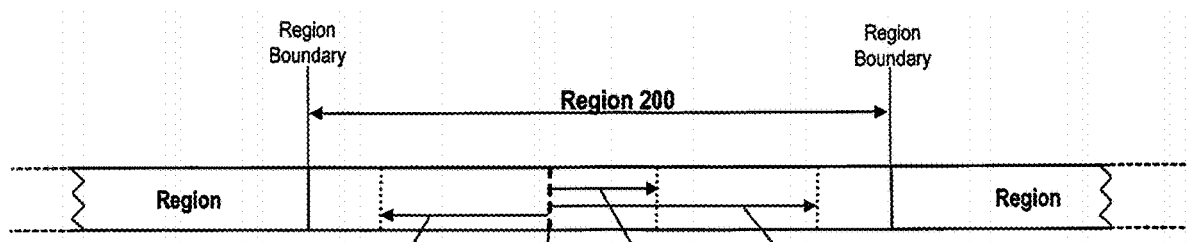
FIG. 2 is an exemplary view of a region within the L2 cache 170, according to an embodiment of the present disclosure.
Figure 3:
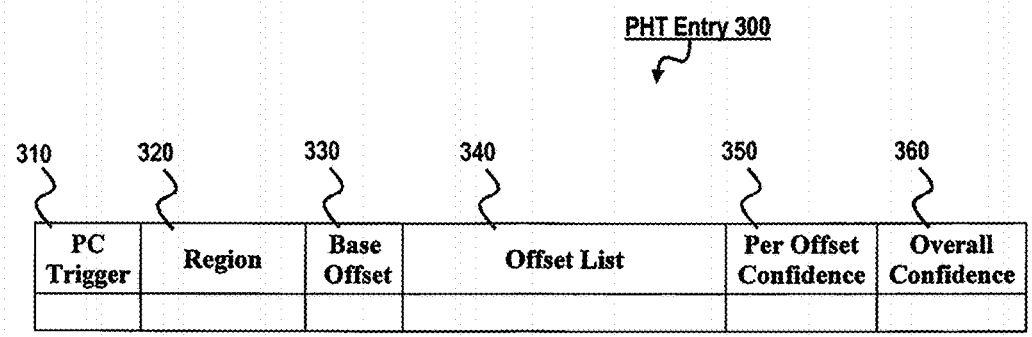
FIG. 3 is an exemplary view of an entry 300 in the pattern history table (PHT) 130, according to an embodiment of the present disclosure.

FIG. 2 is an exemplary view of a region within the L2 cache 170, according to an embodiment of the present disclosure, while FIG. 3 is an exemplary view of an entry 300 in the PHT 130.

As discussed above, once a spatial pattern is recognized by the AGT 120, the spatial pattern, including the trigger for the spatial pattern, is stored in the PHT 130. In FIG. 3, a PHT entry 300 is broken down into several fields. The trigger, in the form of a value of the program counter (PC) which is a trigger for a particular spatial pattern, is stored as a PC trigger field 310, and a region field 320 is a location of the region of a spatial pattern that begins with the PC trigger in PC trigger field 310. A base offset field 330 indicates a starting memory location (base offset) associated with the PC trigger identified in PC trigger field 310 as measured from the region boundary of the region identified by region field 320.

An offset list field 340 store the series of offset values (or "offsets") in relation to the base offset identified in base offset field 330 that make up the spatial pattern following the trigger. As would be understood by one of ordinary skill in the art, such offsets may, for example, be stored as a single spatial vector (also called a spatial bit vector) or as a series, in order, of the locations within the region identified in region field 320 of the spatial pattern associated with the value in PC trigger field 310. In this embodiment, the offsets are stored as a series of offsets from the base offset, like the example of a series of offsets as shown in region 200 of FIG. 2. In embodiments that store the offsets as a spatial bit vector, the spatial pattern is held for N iterations. At each iteration, a bitwise AND function (conservative) or an OR function (aggressive) is performed on the new pattern (of the present iteration) with the old pattern (of the last iteration).

Returning to FIG. 3, a per offset confidence field 350 stores confidence levels associated with each of the offsets stored in the offset list field 340, while an overall confidence field 360 stores the confidence level of the entire series of offsets, i.e., the spatial pattern associated with the value in the PC trigger field 310. The confidence levels are dynamic and change as the SMS learns from the ongoing stream of load instructions.

Figure 4:
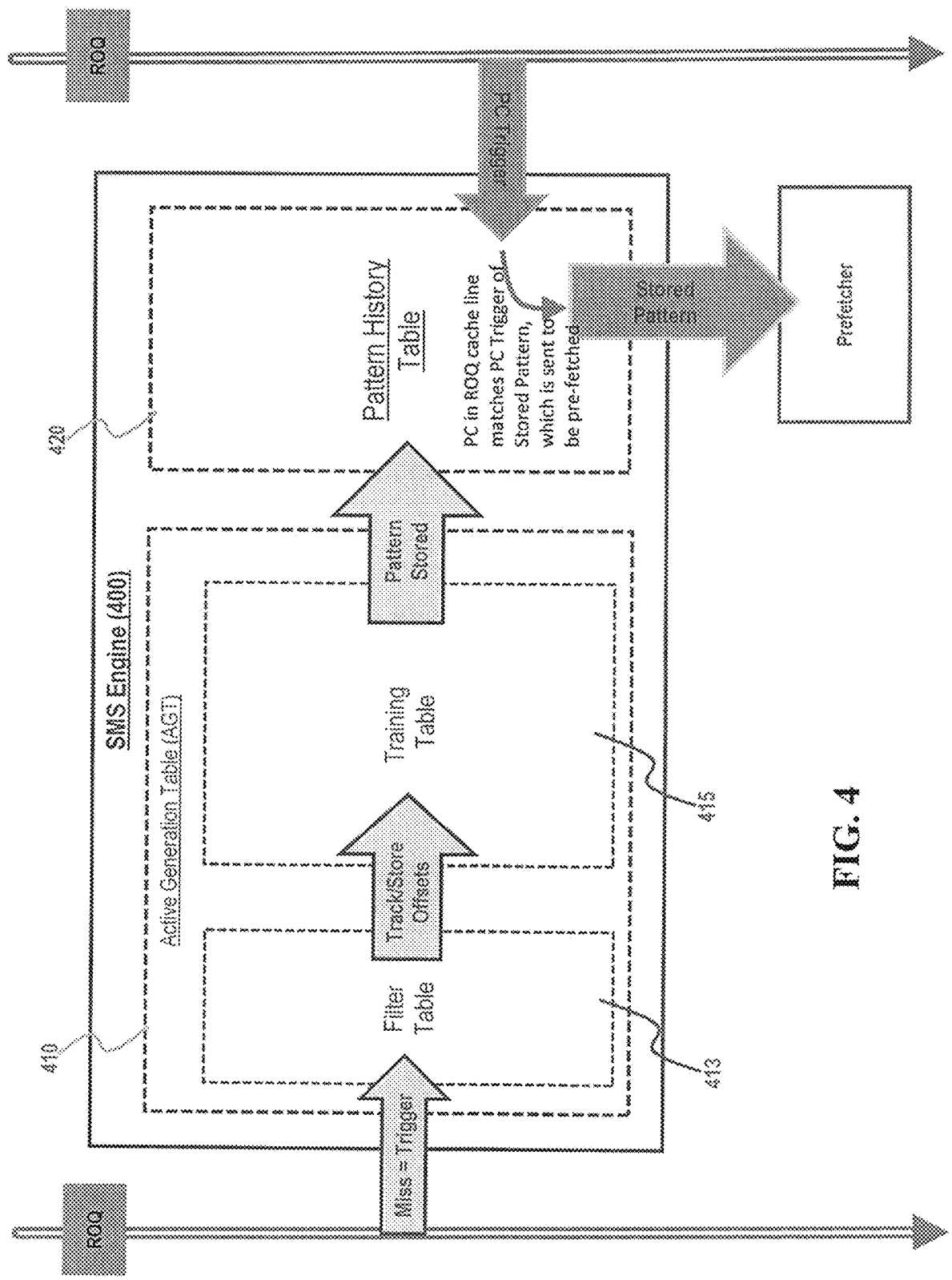
FIG. 4 illustrates an exemplary block diagram of pertinent components of an SMS engine, showing the movement of information therewithin, according to an embodiment of the present disclosure.

FIG. 4 illustrates an exemplary block diagram of pertinent components of an SMS engine, showing the movement of information there within, according to one embodiment. As discussed above, an SMS engine 400 is split into an active generation table (AGT) 410 and the pattern history table (PHT 420). Although the AGT 410 can be conceptually and logically as a single table (and constructed that way as well), in this embodiment, the AGT 410 is implemented as two tables: a filter table 413 and a training (or page) table 415. For convenience of explanation, the reorder queue (ROQ), which takes the various cache load instructions currently available and puts them in the order as needed in the program being executed, is shown on both sides of SMS engine 400, although, of course, there is only one ROQ in this embodiment.

The process starts with a cache load instruction line in the ROQ, which may (or may not) be a miss/trigger to a new spatial pattern, which is temporarily stored/allocated in the filter table 413. In this embodiment the entry includes the same fields as the first three fields in the PHT entry 300, the PC trigger, region (i.e., address of the region), and base offset (i.e., from the region boundary) fields, as shown below:

| Filter Table Entry Fields | | |
|---|---|---|
| PC Trigger | Region | Base Offset |

If the next load instruction is within the same region, which means it can be fetched by a mere offset within the current region rather than fetching another region, a corresponding entry is made in the training table 415. In this embodiment, a training table entry includes the same fields as the first four fields of a PHT entry 300, i.e., the PC trigger, region, base offset, and the offset list fields. As indicated below, the offset list field stores a series of eight different offsets from the base offset.

| Training Table Entry Fields | | | |
|---|---|---|---|
| PC Trigger | Region | Base Offset | Offset List |

Once the PC trigger entry from the filter table 413 is allocated to a training table entry, the training table entry stores additional offsets in the offset list field if the cache load instructions are still within the same region.

Either eviction (which occurs when the PC trigger appears again in the ROQ) or invalidation (which occurs when there are more regions in use than entries in the training table) can stop the spatial pattern, which results in the evicted/invalidated training table entry generating a new PHT entry in the PHT table 420.

In one embodiment, instead of waiting for evictions and invalidations, smarter training is provided by the usage of a trigger-to-trigger stamp where promotion from the training table to the PHT occurs when the PC trigger appears again in the ROQ. In this implementation, an entry is allocated in the filter table 413 on the first miss, using the PC trigger, region address, and base offset. On a second miss in the same region (with a different PC), the filter entry is copied to the training table 415, and the offset from the base access is calculated and also stored in the offset list field of the new training table entry. On the next occurrence of the same value for the PC as the PC trigger, the training table entry is promoted to an entry in the pattern history table 420, and prefetching is begun using the new address as a base region and offset. Before that promotion, any additional accesses in the same region have their offsets calculated and stored in the training table entry.

The learning/training process is broadly described above, and now the active operation of the SMS engine 400 is briefly described below.

As also shown in FIG. 4, the SMS engine may recognize the PC trigger of a stored pattern in the PHT table 420 from the current cache load instruction in the ROQ, and then provide the previously identified and stored spatial pattern corresponding to the PC trigger from the PHT table 420 for prefetching data based on the spatial pattern stored in the PHT table 420 entry.

Figure 5:
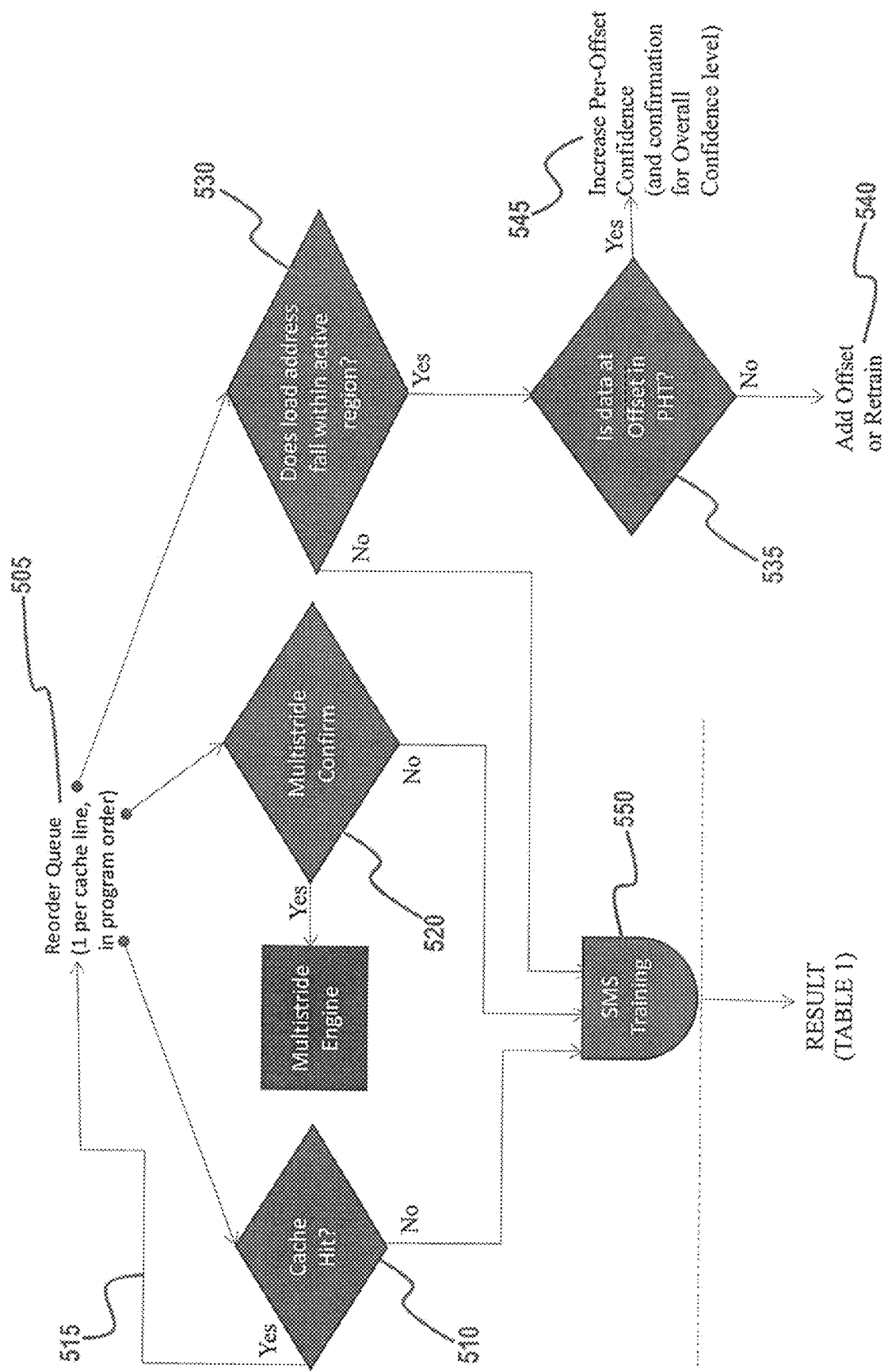
FIG. 5 is a modified flowchart of an exemplary method for training/learning and storing found spatial patterns in accordance with an embodiment of the present disclosure.

FIG. 5 is a modified flowchart of an exemplary method for training/learning and storing found spatial patterns in accordance with an embodiment of the present disclosure.

FIG. 5 begins with the reorder queue (ROQ) 505, which puts the various cache load instructions currently available into the order actually performed in the program. In the present embodiment, 510, 520, and 530 are performed substantially in parallel for the sake of efficiency. At 510, the present system determines whether memory access indicated in the cache load instruction is already in the L1 cache, in which case the method returns at 515 for the next cache load instruction in the ROQ. If the required data accessed at the memory address indicated by the cache load instruction is not available in the L1 cache, the present system performs SMS training at 550 as described more fully below. At 520, the present system determines whether the cache load instruction is for the multistride engine. If the cache load instruction is for the multistride engine, the cache load instruction is forwarded to the multistride engine. If the cache load instruction is not for the multistride engine, the present system performs SMS training at 550.

At 530, the present system determines whether the region containing the required data at the memory address indicated by the cache load instruction falls within the active pattern region. If the region containing the required data at the memory address indicated by the cache load instruction falls within the active pattern region, the present system determines whether the location in the region containing the required data accessed at the memory address indicated by the cache load instruction is identified by any offset in the present PHT entry at 535. If the location in the region containing the required data accessed at the memory address indicated by the cache load instruction is not identified by any offset in the present PHT entry, the offset for the location of the required data is added to the training table or another form of retraining is performed at 540. If the location in the region containing the required data accessed at the memory address indicated by the cache load instruction is identified by the (next) offset in the present PHT entry, the per offset confidence level for that offset is increased at 545. This increase also counts as a "confirmation" for the overall confidence level, as discussed in detail further below.

Table 1 below illustrates the results of SMS training in the form of logical inputs and outputs in one embodiment of the present disclosure. More specifically, based on the states of the filter table and the training table, or, more exactly, based on whether the PC and region fields of the filter table, or the training table match the same values in the current cache line load instruction, Table 1 shows the result. Table 1 is only intended as an aid for explanation/description, and does not correspond to an actual table (such as a lookup table (LUT)) in hardware, but rather shows the output of a system of hardware components which generate such results based on the input (the current cache line load instruction) and training and filter table states.

a system of hardware components according to the present disclosure based on the input (the current cache line load instruction) and training and filter table states.

Figure 6:
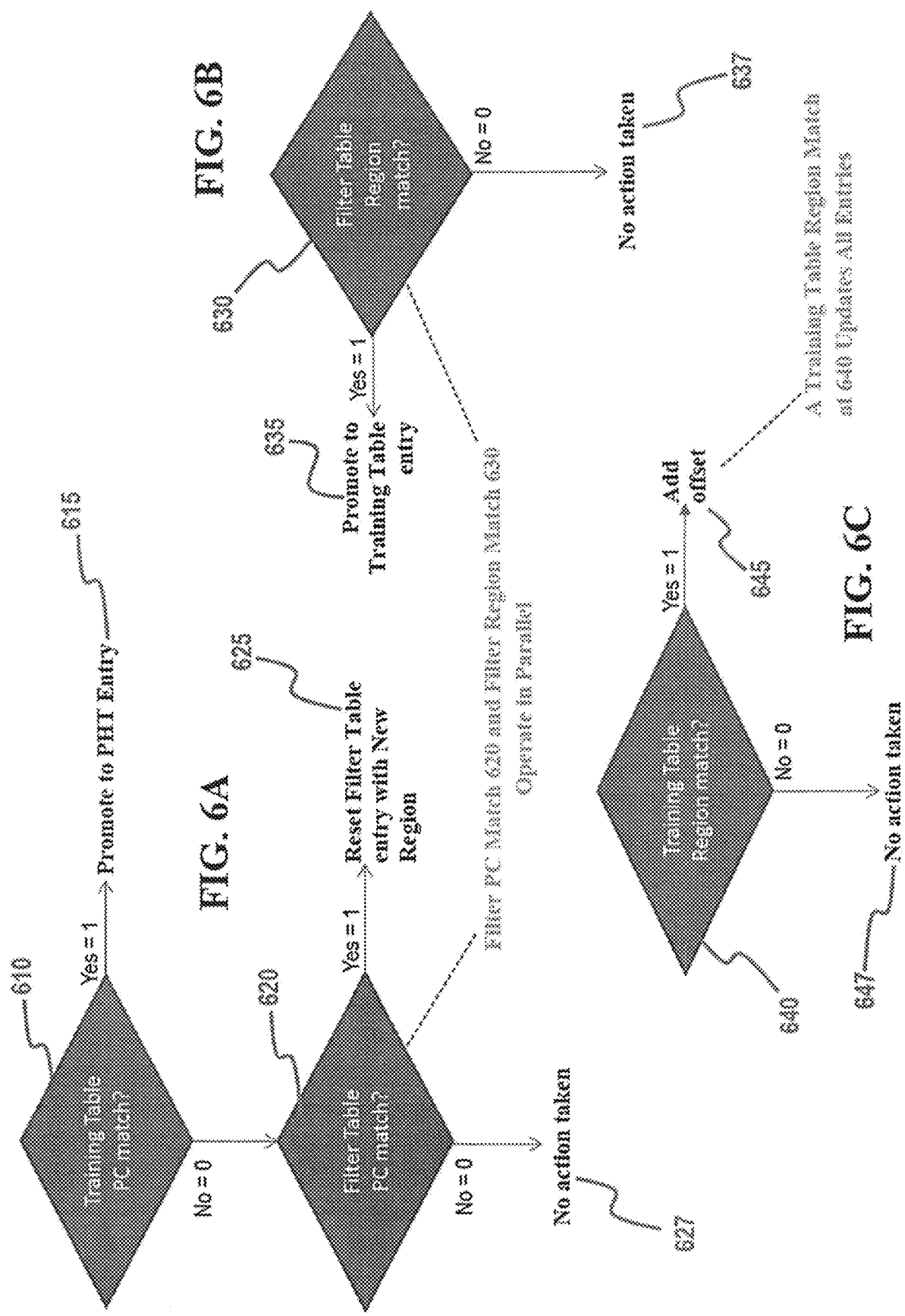
FIGS. 6A-6C provide examples of SMS training results based on filter and training table states in partial flowchart format, according to an embodiment of the present disclosure.

Referring to FIG. 6A, at 610, the present system determines whether the PC of the current ROQ cache load instruction or access matches the PC of the training table entry. If the PC of the current ROQ cache load instruction or access matches the PC of the training table entry (YES=1 at 610), the training table entry is promoted to a PHT entry at 615. If the PC of the current ROQ cache load instruction or access does not match the PC of the training table entry (NO=0 at 610), the present system determines whether the PC of the current ROQ cache load instruction matches the PC of a filter table entry at 620. If the PC of the current ROQ cache load instruction matches the PC of a filter table entry (YES=1 at 620), the filter table entry is reset to new region at 625. If the PC of the current ROQ cache load instruction does not match the PC of a filter table entry (NO=0 at 620), no action is taken at 627.

TABLE 1

Results from SMS Training

| Filter Table PC Match | Filter Table Region Match | Training Table PC Match | Training Table Region Match | RESULT |
|---|---|---|---|---|
| 0 | 0 | 0 | 0 | Allocate filter entry |
| 0 | 0 | 0 | 1 | Add offset to training table entry |
| 0 | 0 | 1 | 0 | Promote training table entry to PHT entry (begin prefetching in new region) |
| 0 | 0 | 1 | 1 | Promote training table entry to PHT entry (begin prefetching in old region, from new offset) |
| 0 | 1 | 0 | 0 | Promote filter table entry to training table entry (add offset, and de-allocate from filter table) |
| 0 | 1 | 0 | 1 | (Impossible) |
| 0 | 1 | 1 | 0 | Promote filter table entry to training table entry (add offset, and de-allocate from filter table) Promote training table entry to PHT entry |
| 0 | 1 | 1 | 1 | (Impossible) |
| 1 | 0 | 0 | 0 | Reset filter table entry with new region and offset |
| 1 | 0 | 0 | 1 | Reset filter table entry with new region and offset Add offset to training table entry |
| 1 | 0 | 1 | 0 | (Impossible) |
| 1 | 0 | 1 | 1 | (Impossible) |
| 1 | 1 | 0 | 0 | Reset filter table entry with new offset |
| 1 | 1 | 0 | 1 | (Impossible) |
| 1 | 1 | 1 | 0 | (Impossible) |
| 1 | 1 | 1 | 1 | (Impossible) |

For the entries labelled "(Impossible)" in Table 1, there are asserts in the code/Register Transfer Language (RTL) which prevent the results from ever occurring. Entries n1n1 (e.g. 0101 and 0111) are listed as "impossible" because the region is unique to the entry in either the filter table or the training table, and once a filter table entry is promoted to attaining table entry, any later PC accesses in the same region simply update the training table entry. Entries 1n1n (e.g., 1010 and 1111) are listed as "impossible" because once a given PC is in the training table, the second occurrence causes the promotion of the entry to the PHT table, and thus later occurrences of that PC trigger cannot be allocated to the filter table, but are rather used to re-train the PHT table entry.

FIGS. 6A-6C provide examples, of SMS training results based on filter and training table states in partial flowchart format, according to an embodiment of the present disclosure. Similarly to Table 1, the flowchart decision diamonds in FIGS. 6A-6C are for purposes of explanation/description, and do not correspond to decision points implemented in software or hardware, but rather show a particular output of Referring to FIG. 6B, at 630, the present system determines whether the region of the current ROQ cache load instruction matches the region of the filter table entry. If the region of the current ROQ cache load instruction matches the region of the filter table entry (YES=1 at 630), which means the next memory access is within the same region and may be defined by an offset, the filter table entry is promoted to a training table entry at 635. If the region of the current ROQ cache load instruction does not match the region of the filter table entry (NO=0 at 630), no action is taken at 637. These operations comparing/matching the PC and region values of the filter table with the current ROQ cache load instruction (e.g., 620 in FIG. 6A and 630 in FIG. 6B) usually operate at the same time (in parallel).

Referring to FIG. 6C, at 640, the present system determines whether the region of the current ROQ cache load instruction matches the region of the training table entry. If the region of the current ROQ cache load instruction matches the region of the training table entry (YES=1 at 640), the offset of the new memory location within the region is added to the training table entry at 645. When there is a training table region match at 640, all training table entries are updated. Training table entries are unique according to their PC trigger, and there could be multiple PC triggers for one region. To handle this, all training table entries are updated for an incoming region. If the region of the current ROQ cache load instruction does not match the region of the training table entry (NO=0 at 640), no action is taken at 647.

According to one embodiment, particular PC triggers are blacklisted to avoid polluting training structures, and enable superior training even in noisy conditions. Blacklisted PC triggers cannot be used for prefetching, thereby preventing useless training and issuing bad prefetches. "Inline" blacklisting uses the PHT entry's own stored confidence levels to prevent its own usage, whereas "out of line" blacklisting uses a separate table to preserve PHT capacity.

Furthermore, trigger-to-trigger stride detection allows prefetch stream to get further ahead of demands. In trigger-to-trigger stride detection, with the second occurrence of the trigger PC, the stride is calculated between the first and second occurrences of the trigger PC and stored in the pattern history table 420. With each new occurrence of the trigger PC, a new stride from the previous trigger PC is calculated. These strides serve as input to a standard stride detection algorithm, the output of which can be used to drive spatially related prefetches in more distant regions.

According to one embodiment, the PC triggers of training table and/or PHT entries are hashed and used as index values for the table entries (instead of the PC triggers themselves), thereby reducing storage while maintaining separation of access patterns for training and activation. The full PC has many bits—at least 40 in a 64-bit architecture—and, rather than storing the full 40 bits, portions of the PC can be arithmetically combined ("hashed") in a fashion that maintains most of the information (and at least enough information that the hashed versions are distinguishable from each other) but uses many fewer bits. In these embodiments, the smaller "hashed" value is stored in the "PC trigger" field of the tables rather than the actual 40 bits of the PC trigger. Moreover, any field for storing PC values can be replaced by its hashed value, rather than storing its full value.

Figure 7:
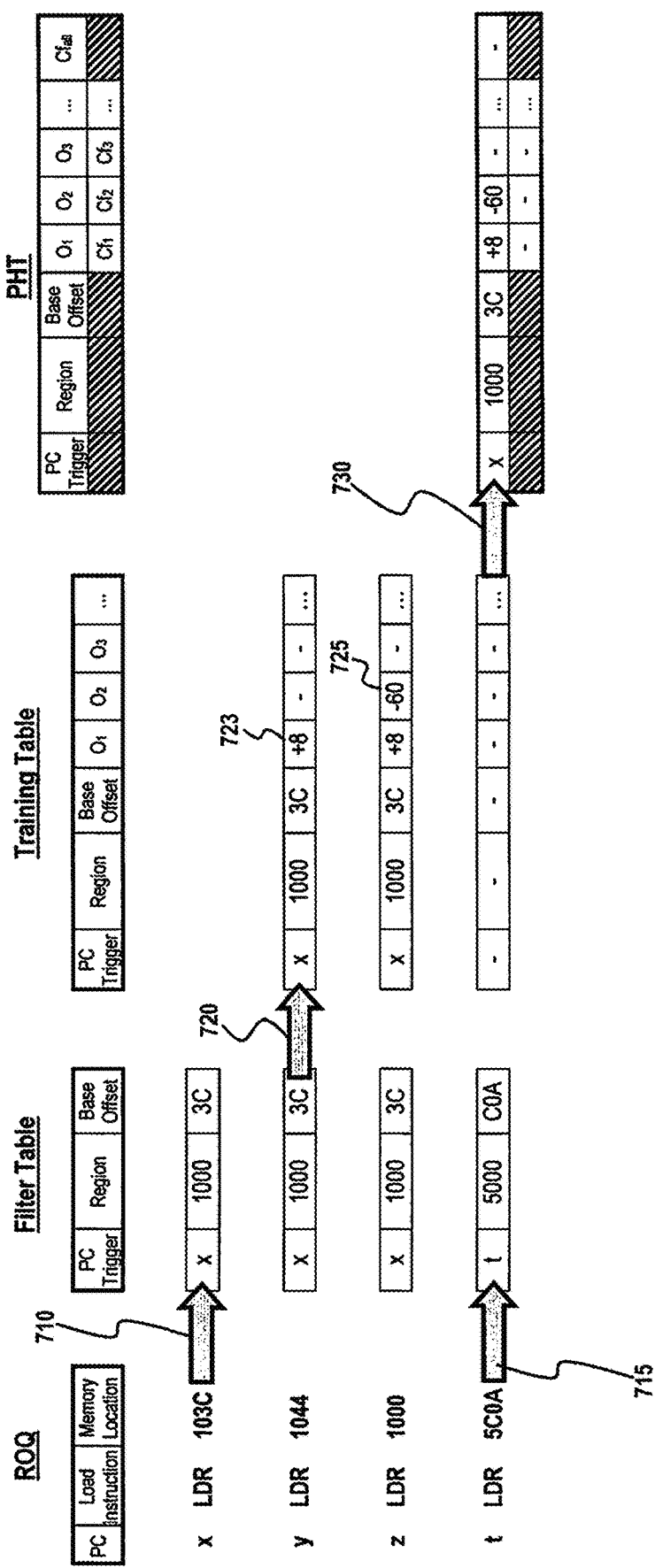
FIG. 7 illustrates an example of how a PHT entry is created from a series of accesses or cache line load instructions or accesses in the reorder queue (ROQ), according to an embodiment of the present disclosure.

FIG. 7 illustrates an example of how a PHT entry is created from a series of cache line load instructions or accesses in the ROQ. FIG. 7 shows the filter table, training table, and PHT of the SMS, as well as a series of cache load commands from the ROQ. The training table entries in FIG. 7 only show the first 3 offsets ($O_1$, $O_2$, $O_3$) from the base offset, with an ellipsis indicating there can be any number of offsets stored in a training table or PHT entry, although in this embodiment, there are only eight offsets stored in both the training table entries and the PHT entries. Similarly, the PHT table entries in FIG. 7 have the first 3 offsets ($O_1$, $O_2$, $O_3$) and an ellipsis, but also, underneath those fields, there are corresponding fields $Cf_1$, $Cf_2$, $Cf_3$, ..., which are the corresponding confidence values for each offset. This configuration is only for ease of description, so each offset appears adjacent to its pre-offset confidence level. The overall confidence level $Cf_{all}$ for the entire spatial pattern is the last field.

In FIG. 7, the first command, having PC=x, is to load the data/instructions in memory location 103C (in hexadecimal notation, where each digit can be 0-F, i.e., 0-15). In this embodiment, each region is assumed to be 4 kB=4,096 bytes, and because 4,096 in decimal notation equals 1,000 in hexadecimal notation, the first digit of the memory location identifies its region—in this case, region 1000. At 710, there is a miss, and so an entry is created in the filter table, where the entry has the (possible) PC trigger, the region (1000), and the base offset (3C).

The next load instruction is for memory location 1044, which is within the same region as the previous load. Accordingly, a new entry is made in the training table at 720, as the two load instructions form a spatial pattern with a region. The entry in the training table has the PC trigger (x), the region (1000), the base offset (3C), and the offset 723 which obtains the value of the current memory location being loaded when combined with the base offset (+8 in decimal notation to obtain 1044 from 103C in hexadecimal notation).

The next load is at memory location 1000, which is still within the region of the new training table entry. Accordingly, a new offset 725 (−60 in decimal notation) is added to the training table entry, thereby increasing the length of the spatial pattern within the region.

The fourth and last load instruction is at memory location 5C0A, which is far outside the region of the new training table entry. Accordingly, the oldest filter table entry is replaced by the new filter entry at 715, where the new entry has the (possible) PC trigger of a new spatial pattern, the starting region (5000), and the base offset (C0A).

At some point in time, the training table entry is deallocated and becomes a new PHT entry at 730. Although 715 and 730 appear to be a simultaneous in FIG. 7, the promotion of a training table entry to a PHT table entry is completely independent from the filter actions. Because the PHT entry is new, there are no values in the per-offset or overall confidence level fields. How such values are created and changed is described in reference to FIG. 8 below.

Figure 8:
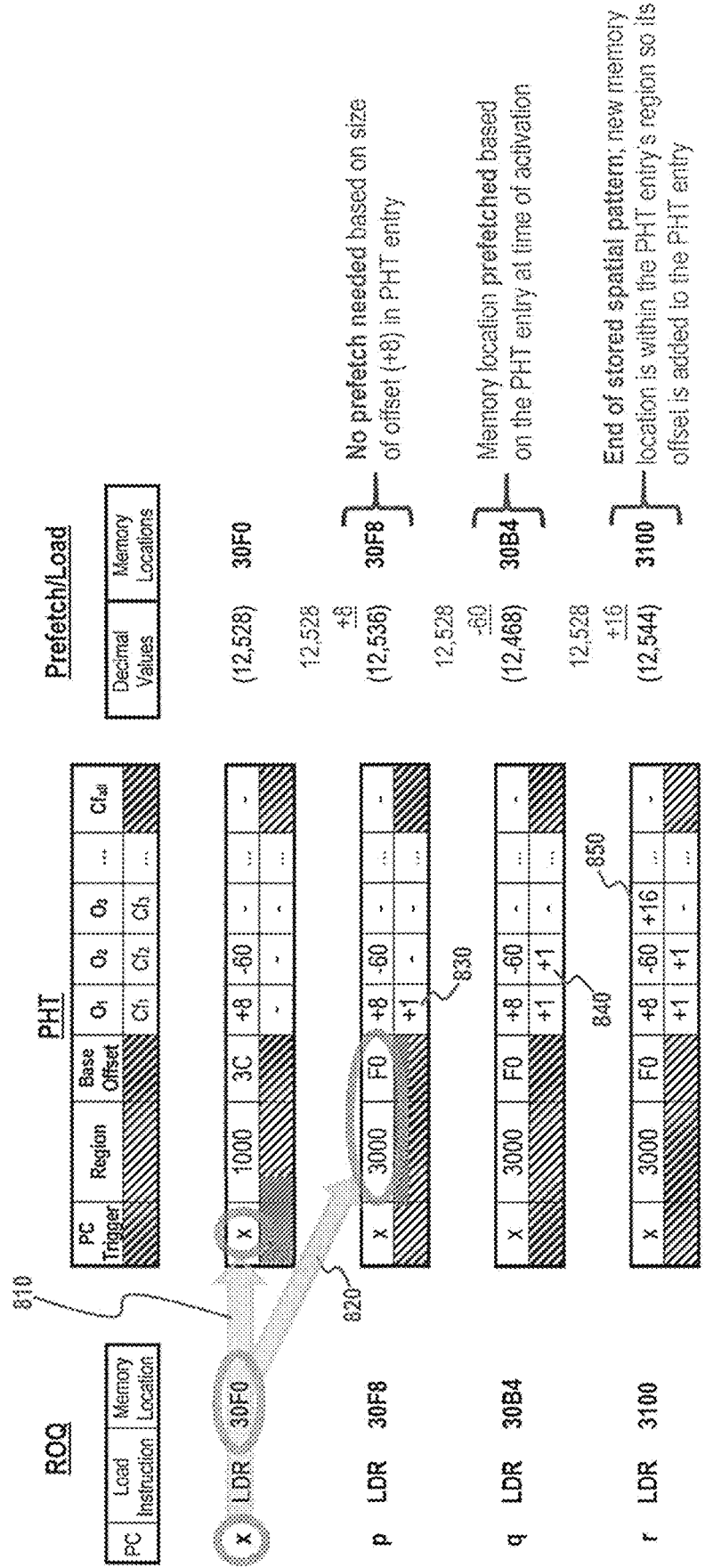
FIG. 8 illustrates an example of how, when a program counter (PC) trigger of a stored PHT entry is recognized in the ROQ, the PHT entry is used to prefetch data/instructions from memory locations indicated by the spatial pattern stored in its offset list field, in accordance with embodiments of the present disclosure.

FIG. 8 illustrates an example of how, when a PC trigger of a stored PHT entry is recognized in the ROQ, the PHT entry is used to prefetch data/instructions from memory locations indicated by the spatial pattern stored in its offset list field. In addition, in accordance with embodiments of the present disclosure, the accuracy of both the individual offsets and the overall spatial pattern is tracked using the per-offset and overall confidence fields in the PHT entry.

FIG. 8 shows just the PHT of the SMS with the series of cache load commands from the ROQ, and another "Prefetch/Load" column is added to show how the load instructions are implemented in accordance with embodiments of the preset disclosure. Since the offsets are in decimal notation, part of the Prefetch/Load column shows the additions and subtractions from decimal values of the memory locations.

In FIG. 8, the first load command has PC=x, which matches the PHT entry with the PC trigger of x, which activates that PHT entry for prefetching at 810. At least because the starting location is arbitrary, and the actual spatial pattern is defined by the relative offsets from the starting point, the region and base offset values of the first load command replace the previous values at 820. Although this replacement is shown at 820 adjacent to the second load command, in the present embodiment, this replacement would occur at the same time as the PHT entry is activated, i.e., roughly simultaneously with the first load command.

According to the PHT entry, the next load is at a +8 offset from the first load instruction. However, typically, the cache line (or block) that is downloaded from the L2 cache is 32, 64, or 128 bytes long, starting from the memory location in the load instruction. Thus, the memory location at a +8 offset has already been downloaded by the previous load instruction. In embodiments according to the present disclosure, the size of the offset is used in order to prevent unnecessary loads, and thus, there is no additional download from the L2 cache to the L1 cache, as the memory location at a +8 offset is already in the L1 cache from the previous load instruction.

However, another aspect of embodiments of the present disclosure is the tracking of the accuracy of the spatial patterns on both on overall and a per-offset level of granularity. Since the second load instruction matches the predicted memory location at the +8 offset (i.e., 30F8) in the PHT entry, a plus one (+1) is added to the per-offset confidence field $Cf_1$ corresponding to the first offset $O_1$ at 830. Similarly, because −60 offset of $O_2$ also matches the next load instruction (30B4), and thus a plus one (+1) is added to the per-offset confidence field $Cf_2$ corresponding to the second offset $O_2$ at 840.

Although discussed above as a series of events, the function of the PHT entry is prefetching, and the 30B4 cache line/block download from the L2 cache was made at roughly the same time as the PHT entry was activated at 810, since the offset value was immediately available in the activated PHT entry. Only the allocation of the per-offset confidence level has to wait for the actual load instruction in the ROQ in order to evaluate whether what was downloaded/prefetched was what was actually needed.

The spatial pattern stored in the PHT entry ends at $O_2$=−60, as originally recorded in FIG. 7. However, in this series of instructions, the next load instruction is for a memory location (3100) is within the region (3000) of the PHT entry. Because of this, the offset (+16) of the next memory location is added as $O_3$ to the PHT entry at 850. Thus, in embodiments of the present disclosure, the PHT entries are continually being refined and evaluated during operation of the core processor(s). Because $O_3$ was just added to the PHT entry, it has no corresponding confidence level $Cf_3$ yet. According to other embodiments of the present disclosure, the confidence level of a newly added offset may be initially allocated a value of +1 or another value which has shown itself to be a good starting confidence level for this series of instructions.

In other embodiments of the present disclosure, the per-offset confidence level of particular offsets over time may be used to eliminate prefetches which do not have a reasonable enough probability of matching the actual load instruction. In the example of a PHT entry below, the spatial pattern of six offsets has some offsets with higher confidence levels ($O_1$ and $O_6$) than others ($O_2$, $O_3$, and $O_5$). In one embodiment of the present disclosure, any offset with a confidence level of 0, like $O_3$, is not prefetched with the rest of the offsets when the PHT entry is activated. The waste in resources caused by a false prefetch outweighs the risk of not using a possibly good, but also possibly bad, prefetch (i.e., the risk of the correct prefetch being ignored because its confidence level is too low).

As another example, in another embodiment of the present disclosure, a threshold is set beneath which any offset value will not be prefetched. Using the example below, if a threshold of >1 is established, the memory locations indicated by offsets $O_2$, $O_3$, and $O_5$ will not be prefetched. In this manner, embodiments of the present disclosure can eliminate faulty prefetches caused by weak members of an overall spatial pattern, while retaining the prefetches which have shown to be accurate over time.

The overall confidence level ($CF_{all}$) for the whole spatial pattern stored in the PHT entry can be calculated and used to improve prefetching accuracy in many different ways. For example, the overall confidence level $CF_{all}$ can be calculated as a saturating counter, which increases in value on a confirmation, and decreases when a trigger PC activates a PHT entry which has no corresponding confirmations (in the worst case scenario). As discussed above, a confirmation may be when an offset in a spatial pattern of a stored PHT entry is shown to be correct and its per-offset confidence level is incremented by +1, as shown at 535 in FIG. 5.

The overall confidence level $CF_{all}$ can be used to improve prefetching accuracy by, for example, determining how many prefetches should be issued before the first confirmation is seen, and/or how many prefetches to issue for each confirmation (this might be nonlinear, e.g., the first confirmation triggers 2 more prefetches, but the second confirmation triggers 3 prefetches, etc.).

As described in detail above, this disclosure provides, inter alia, continuous learning that adapts to changing program behavior; an offset list that captures temporal order; byte granularity that enables differentiation of accesses to a previous line or a subsequent line; a per offset confidence that allows individual offsets to be tracked for accuracy over time; and a confirmation scheme that allows the most prefetches to be issued from the best trained entries.

This disclosure also provides, inter alia, smarter training by having promotion on the second occurrence of the PC trigger and using a trigger-to-trigger stamp; blacklisting of PC triggers in the PHT table (which can be inline or out of line); trigger-to-trigger stride detection; and the use of a hash of the PC trigger to index the PHT entries.

Figure 9:
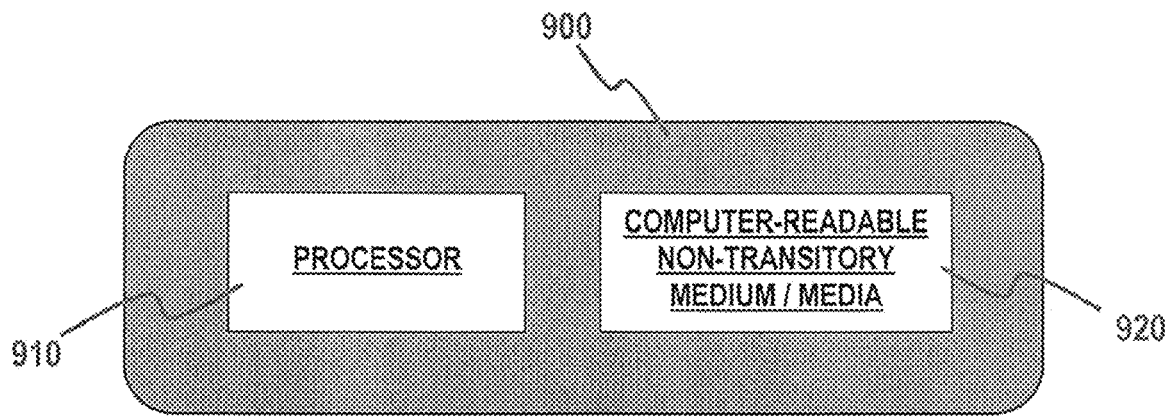
FIG. 9 illustrates an exemplary block diagram of the present apparatus, according to an embodiment of the present disclosure.

FIG. 9 illustrates an exemplary diagram of the present apparatus, according to one embodiment. An apparatus 900 includes at least one processor 910 and one or more non-transitory computer readable media 920. The at least one processor 910, when executing instructions stored on the one or more non-transitory computer readable media 920, performs the steps of maintaining a pattern history table (PHT) for a spatial memory streaming (SMS) prefetch engine, the PHT table comprising at least one table in which each entry has an offset list field comprising sub-fields for offset values from a base offset value within a region and a per-offset confidence field comprising sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry. Moreover, the one or more non-transitory computer-readable media 920 stores instructions for the at least one processor 910 to perform those steps. Continuous learning may be provided to the SMS engine at least by the per-offset confidence levels.

In another embodiment, the at least one processor 910, when executing instructions stored on the one or more non-transitory computer readable media 920, performs the

| | | | Example of PHT Entry | | | | | | | | |
|---|---|---|---|---|---|---|---|---|---|---|---|
| PC Trigger | Region | Base Offset | $O_1$ $Cf_1$ | $O_2$ $Cf_2$ | $O_3$ $Cf_3$ | $O_4$ $Cf_4$ | $O_5$ $Cf_5$ | $O_6$ $Cf_6$ | $O_7$ $Cf_7$ | $O_8$ $Cf_8$ | $CF_{all}$ |
| x | 2000 | C3 | +15 +3 | −32 +1 | +2 0 | +12 +2 | −60 +1 | +5 +4 | — — | — — | — | steps of maintaining a filter table for a streaming memory streaming (SMS) engine, where each entry in the filter table comprises a program counter (PC) trigger, a region address, and a base offset; maintaining a training table for the SMS engine, where each entry in the training table comprises a PC trigger, a region address, a base offset, and a list of offsets from the base offset for memory locations with the same region as the region address; when a current load instruction/access in the reordered queue (ROQ) of the SMS engine results in a miss, allocating a new entry in the filter table, wherein the PC trigger of the new entry is the PC of the current load/instruction and the region address and base offset of the new entry comprise the memory location indicated by the current load instruction/access; when the memory location indicated by the next load instruction/access in the ROQ is within the same region, promoting the new filter table entry to an entry in the training table by allocating a new training table entry comprising the PC trigger of the filter table entry, the region address of the filter table entry, the base address of the filter table entry, and a first offset in the list of offsets, where the first offset is the distance of the memory location within the region, as measured from the base offset; and, whenever the memory location indicated by the next load instruction/access in the ROQ is within the same region, adding another offset to the list of offsets in the training table entry, where it is the offset distance of the memory location within the region, as measured from the base offset. Moreover, the one or more non-transitory computer-readable media 920 stores instructions for the at least one processor 910 to perform those steps.

Figure 10:
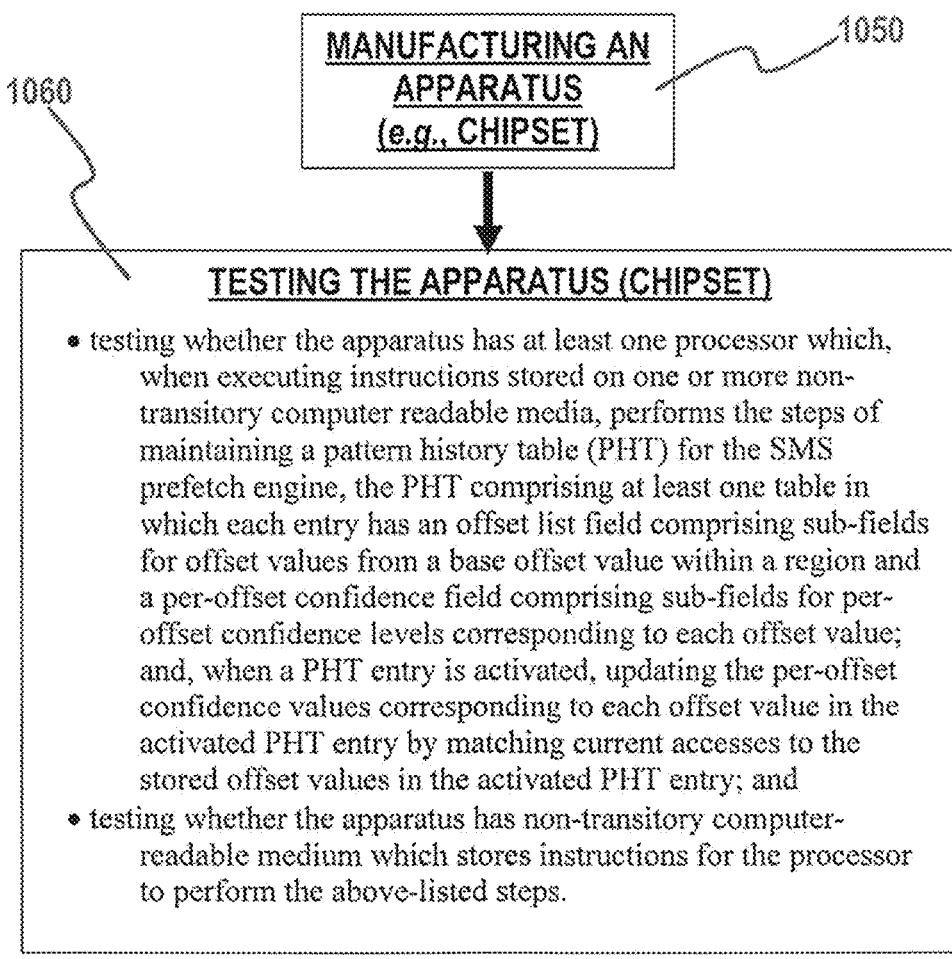
FIG. 10 illustrates an exemplary flowchart for manufacturing and testing the present apparatus, according to an embodiment of the present disclosure.

FIG. 10 illustrates an exemplary flowchart for manufacturing and testing the present apparatus a spatial memory streaming (SMS) prefetch engine, according to one embodiment.

At 1050, the apparatus (in this instance, a chipset) is manufactured, including at least one processor and one or more non-transitory computer-readable media. When executing instructions stored on the one or more non-transitory computer readable media, the at least one processor performs the steps of maintaining a pattern history table (PHT) for a spatial memory streaming (SMS) prefetch engine, the PHT table comprising at least one table in which each entry has an offset list field comprising sub-fields for offset values from a base offset value within a region and a per-offset confidence field comprising sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry. The one or more non-transitory computer-readable media store instructions for the at least one processor to perform those steps. Continuous learning may be provided to the SMS engine at least by the per-offset confidence levels.

At 1060, the apparatus (in this instance, a chipset) is tested. Testing 1160 includes testing whether the apparatus has at least one processor which, when executing instructions stored on one or more non-transitory computer readable media, performs the steps of maintaining a pattern history table (PHT) for a spatial memory streaming (SMS) prefetch engine, the PHT table comprising at least one table in which each entry has an offset list field comprising sub-fields for offset values from a base offset value within a region and a per-offset confidence field comprising sub-fields for per-offset confidence levels corresponding to each offset value; and, when a PHT entry is activated, updating the per-offset confidence values corresponding to each offset value in the activated PHT entry by matching current accesses to the stored offset values in the activated PHT entry; and testing whether the apparatus has the one or more non-transitory computer-readable media which store instructions for the at least one processor to perform the above steps. Continuous learning may be provided to the SMS engine at least by the per-offset confidence levels.

In another embodiment, a chipset is manufactured, including at least one processor and one or more non-transitory computer-readable media. The at least one processor, when executing instructions stored on the one or more non-transitory computer readable media, performs the steps of maintaining a filter table for a streaming memory streaming (SMS) engine, where each entry in the filter table comprises a program counter (PC) trigger, a region address, and a base offset; maintaining a training table for the SMS engine, where each entry in the training table comprises a PC trigger, a region address, a base offset, and a list of offsets from the base offset for memory locations with the same region as the region address; when a current load instruction/access in the reordered queue (ROQ) of the SMS engine results in a miss, allocating a new entry in the filter table, wherein the PC trigger of the new entry is the PC of the current load/instruction and the region address and base offset of the new entry comprise the memory location indicated by the current load instruction/access; when the memory location indicated by the next load instruction/access in the ROQ is within the same region, promoting the new filter table entry to an entry in the training table by allocating a new training table entry comprising the PC trigger of the filter table entry, the region address of the filter table entry, the base address of the filter table entry, and a first offset in the list of offsets, where the first offset is the distance of the memory location within the region, as measured from the base offset; and, whenever the memory location indicated by the next load instruction/access in the ROQ is within the same region, adding another offset to the list of offsets in the training table entry, where it is the offset distance of the memory location within the region, as measured from the base offset. Moreover, the one or more non-transitory computer-readable media stores instructions for the at least one processor to perform the above steps.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to, one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

The present disclosure is not limited to the embodiments discussed herein, and, as would be understood by one of ordinary skill in the art, the details of a particular implementation will vary depending on intended use, environment, etc., and thus the present disclosure is intended to apply to any implementation within its scope.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A spatial memory streaming (SMS) prefetch engine, comprising:
a pattern history table (PHT) comprising at least one table in which each entry has an offset list field comprising sub-fields for offset values from a base offset value within a region and a per-offset confidence field comprising sub-fields for per-offset confidence levels corresponding to each offset value in the offset list field,
wherein, when a PHT entry is activated, the per-offset confidence levels corresponding to each offset value therein are updated by matching current accesses to the stored offset values in the activated PHT entry,
wherein continuous learning is provided to the SMS engine at least by the per-offset confidence levels; and
wherein the per-offset confidence levels are used to eliminate one or more offset values from the offset list field of a PHT entry.

2. The SMS prefetch engine of claim 1, wherein a per-offset confidence level is updated by incrementing the per-offset confidence level when the offset value corresponding to the per-offset confidence level matches a corresponding access, and
wherein the per-offset confidence level is updated by decrementing the per-offset confidence level when the offset value corresponding to the per-offset confidence level has not matched any corresponding access between two trigger program counters (PCs), the two trigger PCs having the same value which starts and ends a spatial pattern in a queue of instructions.

3. The SMS prefetch engine of claim 1, wherein one or more preset thresholds are applied to the per-offset confidence levels to determine whether to eliminate one or more offset values from the offset list field of the PHT entry.

4. The SMS prefetch engine of claim 1, wherein, when memory locations corresponding to a plurality of offset values within the offset list are within a single cache line, the SMS prefetch engine only prefetches the single cache line once.

5. The SMS prefetch engine of claim 1, wherein each PHT entry further comprises a base offset field including the base offset value within the region, and
wherein the base offset value provides byte granularity.

6. The SMS prefetch engine of claim 1, wherein each PHT entry further comprises an overall confidence field whose value represents a confidence level in the entire spatial pattern made by offset values stored in the offset list field, and
wherein continuous learning is provided to the SMS prefetch engine at least by the overall confidence field.

7. The SMS prefetch engine of claim 6, wherein each increase in a per-offset confidence level of an offset value in the offset list field in a PHT entry comprises a confirmation which increases, in turn, the overall confidence level in the overall confidence field for that PHT table entry, and
wherein each decrease in a per-offset confidence level of an offset value in the offset list field in a PHT entry results in a decrease in the overall confidence level in the overall confidence field for that PHT table entry.

8. A method for a spatial memory streaming (SMS) prefetch engine, comprising:
   maintaining a pattern history table (PHT) comprising at least one table in which each entry has an offset list field comprising sub-fields for offset values from a base offset value within a region and a per-offset confidence field comprising sub-fields for per-offset confidence levels corresponding to each offset value;
   activating a PHT entry;
   updating the per-offset confidence levels corresponding to each offset value in the activated PHT entry by matching current accesses to the stored offset values in the activated PHT entry; and
   eliminating one or more offset values from the offset list field of a PHT entry according to their respective per-offset confidence levels,
   wherein continuous learning is provided to the SMS engine at least by the per-offset confidence levels.

9. The method of claim 8, wherein updating the per-offset confidence levels comprises:
incrementing the per-offset confidence level when the offset value corresponding to the per-offset confidence level matches a corresponding access, and
   decrementing the per-offset confidence level when the offset value corresponding to the per-offset confidence level has not matched any corresponding access between two trigger program counters (PCs), the two trigger PCs having the same value which starts and ends a spatial pattern in a queue of instructions.

10. The method of claim 8, wherein eliminating one or more offset values from the offset list field of a PHT entry comprises:
   applying one or more preset thresholds to the per-offset confidence levels to determine whether to eliminate their respective one or more offset values from the offset list field of the PHT entry.

11. The method of claim 8, wherein, when memory locations corresponding to a plurality of offset values within the offset list are within a single cache line, the SMS prefetch engine only prefetches the single cache line once.

12. The method of claim 8, wherein each PHT entry further comprises the base offset field including the base offset value within the region, and
   wherein the base offset value provides byte granularity.

13. The method of claim 8, wherein each PHT entry further comprises an overall confidence field which represents a confidence level in the entire spatial pattern made by the offset values stored in the offset list field, and
   wherein continuous learning is provided to the SMS prefetch engine at least by the overall confidence field.

14. The method of claim 13, wherein each increase in a per-offset confidence level corresponding to an offset value in the offset field list in a PHT entry comprises a confirmation which increases, in turn, the overall confidence level for that PHT table entry, and
   wherein each decrease in a per-offset confidence level of an offset value in the offset list field in a PHT entry results in a decrease in the overall confidence level in the overall confidence field for that PHT table entry.

15. An apparatus, comprising:
one or more non-transitory computer-readable media; and
at least one processor which, when executing instructions stored on one or more non-transitory computer readable media, comprises at least a part of a spatial memory streaming (SMS) prefetch engine which performs the steps of:
   maintaining a pattern history table (PHT) comprising at least one table in which each entry has an offset list field comprising sub-fields for offset values from a base offset value within a region and a per-offset confidence field comprising sub-fields for per-offset confidence levels corresponding to each offset value;
   activating a PHT entry;
   updating the per-offset confidence levels corresponding to each offset value in the activated PHT entry by matching current accesses to the stored offset values in the activated PHT entry; and
   eliminating one or more offset values from the offset list field of a PHT entry according to their respective per-offset confidence levels.

16. A method, comprising:
manufacturing a chipset comprising:
   at least one processor which, when executing instructions stored on one or more non-transitory computer readable media, performs the steps of:
      maintaining a pattern history table (PHT) for a spatial memory streaming (SMS) prefetch engine, the PHT table comprising at least one table in which each entry has an offset list field comprising sub-fields for offset values from a base offset value within a region and a per-offset confidence field comprising sub-fields for per-offset confidence levels corresponding to each offset value;
      activating a PHT entry;
      updating the per-offset confidence levels corresponding to each offset value in the activated PHT entry by matching current accesses to the stored offset values in the activated PHT entry; and
      eliminating one or more offset values from the offset list field of a PHT entry according to their respective per-offset confidence levels; and
   the one or more non-transitory computer-readable media which store the instructions.

17. A method of testing an apparatus, comprising:
testing whether the apparatus has at least one processor which, when executing instructions stored on one or more non-transitory computer readable media, performs the steps of:
   maintaining a pattern history table (PHT) for a spatial memory streaming (SMS) prefetch engine, the PHT table comprising at least one table in which each entry has an offset list field comprising sub-fields for offset values from a base offset value within a region and a per-offset confidence field comprising sub-fields for per-offset confidence levels corresponding to each offset value;
   activating a PHT entry;
   updating the per-offset confidence levels corresponding to each offset value in the activated PHT entry by matching current accesses to the stored offset values in the activated PHT entry; and
   eliminating one or more offset values from the offset list field of a PHT entry according to their respective per-offset confidence levels; and
testing whether the apparatus has the one or more non-transitory computer-readable media which store the instructions.

* * * * *